Dec. 4, 1934.    E. B. KEMPSTER, JR    1,983,512
RAILWAY TRAFFIC CONTROLLING SYSTEM
Filed April 30, 1932
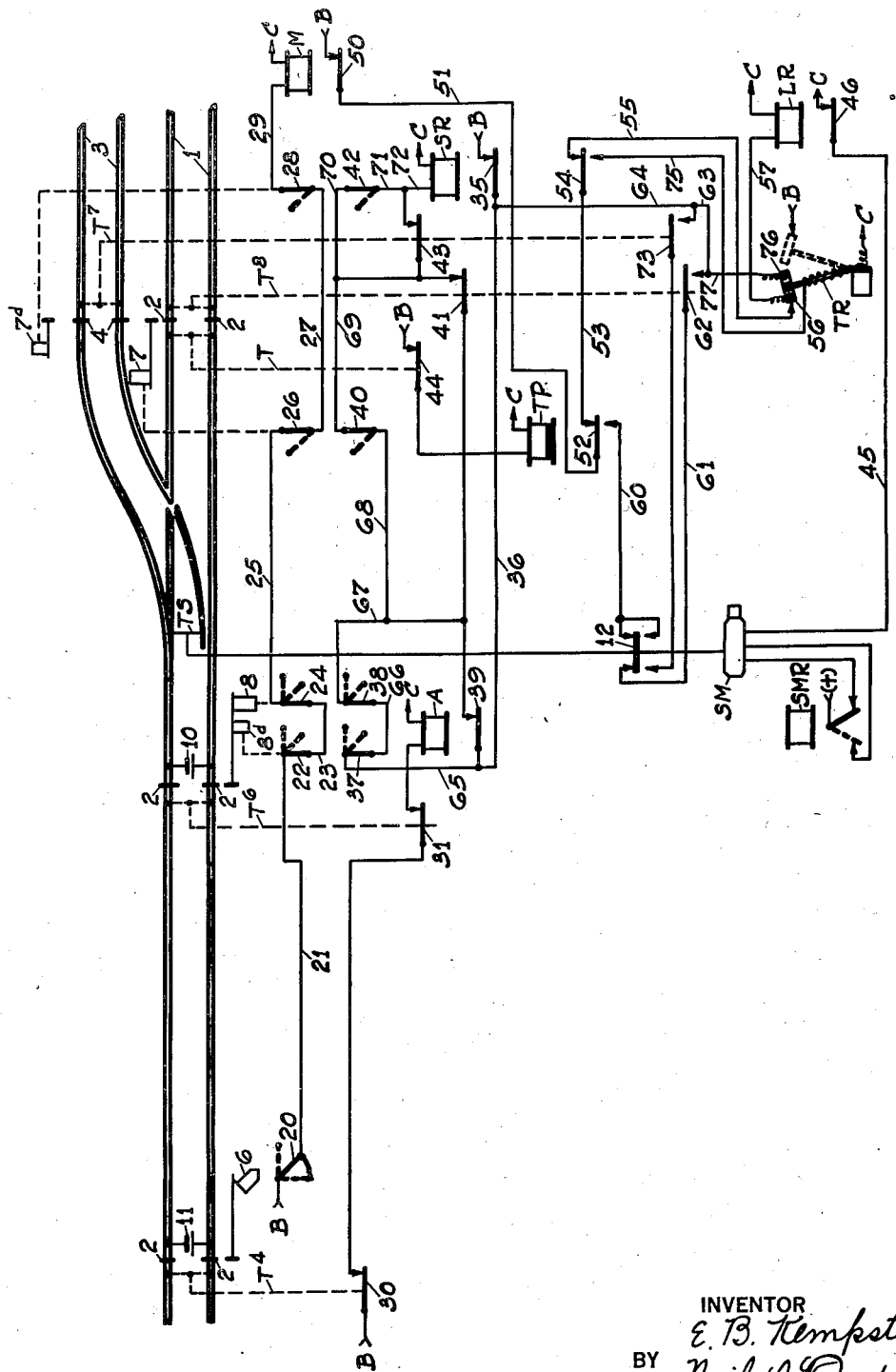
INVENTOR
E. B. Kempster, Jr.
BY Neil D. Reston
his ATTORNEY Patented Dec. 4, 1934

1,983,512

UNITED STATES PATENT OFFICE 1,983,512

RAILWAY TRAFFIC CONTROLLING SYSTEM

Ernest B. Kempster, Jr., Rochester, N. Y., assignor to General Railway Signal Company, Rochester, N. Y.

Application April 30, 1932, Serial No. 608,501

5 Claims. (Cl. 246—3)

This invention relates to remote controlled wayside track switches, and more particularly to the provision of approach locking means for preventing power operation of the track switch under certain traffic conditions.

In the provision of locking means for preventing the operation of power operated switches under unsafe traffic conditions, it is important that suitable release features be included in such an organization, so that power operation of the track switch is not prevented when it is safe to operate the track switch in spite of the presence of a train on the approach section. Such release feature may include the provision of means whereby a departing train may release the track switch locking means, or a device which will release locking of the track switch after the signals associated with such track switch have been at stop for a time sufficient to have allowed an approaching train either to have passed on to the detector locking for the track switch or to have come to stop before reaching the same in recognition of a signal at stop. Because momentary clearing of signals may cause the engineer of an approaching train to move at speed, it is expedient to employ a stick relay dropped by clearing of the signal which cannot be picked up except under certain predetermined conditions, such as the lapse of time, this to perpetuate the locking to protect traffic in the event the engineer did act on the momentary clear signal. If such a stick relay is used and signals are cleared only momentarily, it would be expedient not to drop such stick relay in response to momentary clearing of such a signal, unless there is then a train approaching such signal, and one of the features of the present invention includes circuits for preventing dropping of the stick relay if there is no train approaching during momentary clearing of a signal. Other features of the present invention include lock releasing means requiring two adjacent track circuits to be simultaneously occupied, these track circuits being selected in accordance with the position of the track switch.

Other objects, purposes and characteristic features of the invention will in part be obvious from the accompanying drawing and will in part be more specifically pointed out hereinafter.

In describing the invention in detail, reference will be made to the single drawing, illustrating one embodiment of the present invention.

Referring to the drawing, the track rails 1 have been shown divided into blocks by insulating joints 2, each block of which is provided with the usual track circuit. Adjacent the main track there has been illustrated a siding including track rails 3 insulated from the track rails of the main track through the medium of insulating joints 4, this siding being connected to the main track through the medium of a track switch TS. Associated with the track switch TS is a detector track circuit including a track relay T and a track battery 10. The approach track section facing the points of the track switch TS is provided with a track circuit including the track battery 11 and track relay $T^6$, whereas the next track circuit in the rear includes a track relay $T^4$, and the track circuit next in advance of the detector track circuit includes a track relay $T^3$. The siding has a track circuit including a track relay $T^7$.

The track switch TS has been shown connected to a switch machine SM for power operation of the same, which switch machine SM includes a suitable point detector contact 12, assuming suitable circuit closed positions when the switch machine is in an extreme locked position. The system shown also includes the lock relay LR, a suitable slow acting thermal relay TR, a stick relay SR, a slow acting detector track repeater relay TP, repeating the detector track relay T, an approach relay A, and a signal-at-stop relay M. The switch machine SM is in practice controlled by a suitable control relay SMR, controlled in any suitable manner from a distant point. It is believed that the system is most readily understood by considering the operation of the same, which will now be taken up.

Operation

Under normal conditions, that is, with the signals directly associated with the track switch TS at stop, so that their respective approach signals are at caution, the signal-at-stop relay is energized through the following circuit:—beginning at the terminal B of a suitable battery, contact 20 of the signal 6 closed when the signal 6 is in the caution position, wire 21, contact 22 of the signal $8^d$ assuming the stop position, wire 23, contact 24 closed when the signal 8 assumes the stop position, wire 25, contact 26 closed when the signal 7 assumes the stop position, wire 27, contact 28 closed when the signal $7^d$ assumes the stop position, wire 29, winding of the relay M to the other terminal C of said battery. Similarly, the approach relay A is energized through a circuit including front contacts 30 and 31 of the track relays T⁴ and T⁶, respectively.

The stick relay SR is normally energized through the following stick circuit:—beginning at the terminal B of a suitable battery, stick contact 35 of the relay SR, wire 36, contacts 37 and 38 respectively controlled by the signals 8ᵈ and 8 and closed when the signals are at stop, said contacts connected in series, and having in multiple therewith a front contact 39 of the approach relay A, the contact 40 closed when the signal 7 is at stop, having in multiple therewith a front contact 41 of the track relay T⁸, a contact 42 controlled by the signal 7ᵈ and closed only when this signal is in the stop position and having in multiple therewith a front contact 43 of the track relay T⁷, winding of the stick relay SR to the other terminal C of the battery.

The lock relay LR, which must be energized to permit power operation of the switch machine SM, because the common wire 45 of the switch machine includes in series therewith the front contact 46 of the relay LR, is also normally energized. The energizing circuit for this relay LR may traced as follows:—beginning at the terminal B of a suitable battery, front contact 50 of the signal-at-stop relay M, wire 51, front contact 52 of the detector track repeater relay TP, repeating the detector track relay T through contact 44, wire 53, front contact 54 of the stick relay SR, wire 55, normal or back contact 56 of the thermal relay TR, wire 57, winding of the relay LR, to the other terminal C of said battery.

Having now considered all of the normally closed circuits, let us observe how the operation of signals or the approach of a train will result in dropping of the lock relay LR thus preventing operation of the switch machine SM. For instance, if one of the signals 7, 7ᵈ, 8 or 8ᵈ should be cleared by the operator, these signals being subject to manual control in any suitable manner (not shown), and also being controlled in accordance with traffic conditions in advance (not shown), clearing of such signal will result in dropping of the signal-at-stop relay M, which by opening of its contact 50 will result in deenergization of the lock relay LR. It will, however, be noted that if such signal is immediately returned to the stop position the relay M will again pick up resulting in reenergization of the lock relay LR. If, on the other hand, a train should approach the signal 6 and drop the track relay T⁴, such dropping of this track relay T⁴ would result in dropping of the stick relay SR if one or the other of the signals 8 or 8ᵈ had been cleared, this because if contact 39 of approach relay A is opened while contacts 37 or 38 of signals 8ᵈ and 8 are open the stick relay SR will be deenergized, but if the operator had cleared the signal 7 or 7ᵈ the approach of a train upon the track circuit containing track relay T⁴ would not result in dropping the stick relay SR.

The momentary clearing of a signal thus locks the switch so long as the signal is clear, but the locking of such switch is not perpetuated unless there is a train approaching such cleared signal.

Let us now assume that there is a train approaching the signal 6 in the direction governed by such signal, and that this approaching train has deenergized the track relay T⁴, and that the operator clears the signal 8, and the signal 6 also goes to clear.

There are at least two situations which may develop when a train is thus in approach to the signal 6 and both of the signals 6 and 8 are cleared. One situation is when the signal 8 is put to stop followed by the movement of signal 6 to a caution position at substantially the same time that the train passes the signal 6 so that the engineer does not receive the caution indication of signal 6 and is therefore unable to stop for the signal 8 in its stop condition. The other situation is when the signal 8 is caused to remain in a clear condition for the train to proceed in the usual manner, and the signals 6 and 8 are automatically put to stop. With either condition assumed, the stick relay SR is deenergized because contacts 38 of the signal 8 and contact 39 of relay A are both open at the same time, and since they are included in multiple in the stick circuit for the relay SR, this relay SR must drop, opening its stick contact 35 and thereby remaining in its deenergized condition in spite of return of the signal 8 to the stop position by either manual or automatic control.

The switch machine SM is locked during the passage of the train by reason of open front contact 52, and after the signal 8 is put to stop by either manual or automatic control as has been assumed, thus reenergizing the signal-at-stop relay M, the stick relay SR will be picked up during the time that the train in question straddles the insulating joints 2 at the signal 7, namely, when the track relays T and T⁸ are both deenergized. This pick-up circuit for the stick relay SR may be traced as follows:—beginning at the terminal B of a suitable battery, front contact 50 of the signal-at-stop relay M, wire 51, back contact 52 of the repeater relay TP, wire 60, point detector contact 12 assuming the normal position, wire 61, back contact 62 of the track relay T⁸, wires 63, 64, 36 and 65, contact 37 of the signal 8ᵈ, wire 66, contact 38 of the signal 8, wires 67 and 68, contact 40 of the signal 7, wires 69 and 70, contact 42 of the signal 7ᵈ, wires 71 and 72, winding of the stick relay SR to the common return wire C.

With this stick relay SR once picked up, it will be stuck up through its stick circuit including stick contact 35. With this stick relay SR once picked up and with the signal-at-stop relay M energized, the lock relay LR is energized as soon as the detector track repeater relay TP assumes its energized position, which is the case when the rear end of the train passes beyond the insulating joints 2 adjacent the signal 7. In a similar manner, movement of the train into the siding may restore the stick relay SR when the detector track repeater relay TP is deenergized simultaneously with the deenergized condition of the track relay T⁷, this through the medium of back contact 73 of the relay T⁷ while the track switch TS assumes its take siding position and the point detector contact assumes its corresponding position.

Let us now assume that there is an east-bound train approaching the signal 6, and that the operator puts the signal 8 to stop in the face of the approaching train, namely, when the train had already deenergized track relay T⁴ but before it reached signal 6, so that the train by reason of the signal 6 indicating caution comes to a stop just before reaching the signal 8. Under the condition assumed the stick relay SR has been deenergized, because the signal 8 was still clear when the approach relay A was deenergized by the approaching train, thus resulting in locking of the switch machine SM against operation.

Under the condition assumed, the thermal relay TR will be energized upon placing signal 8 to stop through the following circuit:—beginning at the terminal B, front contact 50 of the signal-at-stop relay M, wire 51, front contact 52 of the detector track repeater relay TP, wire 53, back contact 54 of the stick relay SR, wire 75, heating coil of the thermal relay TR to the common return wire C connected to the other terminal of said battery. After an interval of time, of say one to two minutes, the thermal relay TR will have been heated to a temperature to effect closure of the contact 76, as a result of which the following circuit for picking up the stick relay SR is closed:—beginning at the terminal B, contact 76 of the thermal relay TR, wires 77, 63, 64, 36 and 65, contact 37 of the signal $8^d$, wire 66, contact 38 of the signal 8, wires 67 and 68, contact 40 of the signal 7, wires 69 and 70, contact 42 of the signal $7^d$, wires 71 and 72, winding of the relay SR to the common return wire C. Completion of this circuit will of course pick up the stick relay SR, which will then stick up through its stick contact 35.

The lock relay LR, will, however, not pick up immediately, this because the contact 56 of the thermal relay must first reclose, which will require another interval of time, say two to three minutes, namely, the time necessary for the coil of the thermal relay TR to cool. Closure of the contact 56 of thermal relay TR will then complete the normal energizing circuit for the lock relay LR. It may be pointed out that this over-and-back movement of the thermal relay TR is employed in order to restore the thermal relay TR to its original temperature condition before the lock relay LR is rendered available for releasing the switch machine. Thus, if the thermal relay TR should be called upon several times in close succession, its functioning would be the same as when called on for the first time to carry out its function, so that uniformity in time measuring results is attained. With the lock relay LR now energized, the operator is, of course, free to operate the track switch TS, so that the east-bound train under consideration may move into the side track 3.

Let us now review the system shown to get a clear understanding of the functions performed thereby. It should be noted that the stick relay SR will not be deenergized due to clearing of the signal, nor will it be deenergized due to the approach of the train, but it will be deenergized if there is a train approaching a signal which has been cleared. This feature avoids dropping of the stick relay SR, which if once dropped cannot be readily restored, because either a train must occupy the detector track circuit and an adjacent track circuit in order to pick up the stick relay as through back contact 62 of relay $T^3$ or contact 73 of relay $T^7$, or the thermal relay TR must operate through its back-and-forth thermal cycle. In this connection, it should be noted that if one of the signals is clear the signal-at-stop relay M will be deenergized which in turn results in deenergization of the lock relay LR, but restoration of such signal to its stop condition will restore the relay M and in turn restore the lock relay LR in the absence of an approaching train. Also, it should be noted that picking up of the stick relay SR through back contact 62 of track relay $T^3$ or back contact 73 of track relay $T^7$ will not take place unless the point detector contact 12 assumes the proper position and the detector track repeater relay TP is deenergized. In other words, two adjacent track relays must be deenergized to perform this function. This feature is employed so that accidental or momentary dropping of a track relay cannot restore a stick relay SR, it being assumed that two adjacent track relays will not be accidentally or momentarily deenergized at the same time.

Applicant has thus proposed a system for locking a track switch against mal-operation which affords the various facilities necessary for switching and other train movements and at the same time the system affords the necessary safety to avoid operation of the track switch in the face of an approaching train.

Having thus shown and described one specific embodiment of the present invention, it is desired to be understood that the particular embodiment illustrated has not been selected for the purpose of showing the scope of the invention nor the exact construction necessarily employed to practice the invention, and that various changes, modifications and additions may be made to adapt the invention to the particular problem encountered in practicing the same, all without departing from the spirit or scope thereof, except as demanded by the scope of the following claims.

What I claim as new is:—

1. Switch locking means for locking a track switch against operation comprising, a normally energized stick relay which is deenergized upon a signal governing traffic over said track switch indicating clear only if there be a train approaching such signal, a locking circuit permitting operation of said track switch including a contact closed when said signal is at stop and said stick relay is energized, and automatically controlled slow acting means for reenergizing said stick relay.

2. Switch locking means for locking a track switch against operation comprising, a normally energized stick relay which is de-energized only if a signal governing traffic over a track switch indicates clear while there is a train approaching such signal, a locking circuit permitting operation of said track switch including a contact closed only when said signal is at stop and said stick relay is energized, and means for reenergizing said stick relay only if two adjacent track circuits associated with said track switch are shunted simultaneously.

3. Switch locking means for locking a track switch against operation comprising, a normally energized stick relay which is de-energized only if a signal governing traffic over a track switch indicates clear while there is a train approaching such signal, a locking circuit permitting operation of said track switch including a contact closed when said signal is at stop and said stick relay is energized, and means for reenergizing said stick relay only if two adjacent track circuits associated with said track switch are shunted simultaneously and said track switch assumes the proper position corresponding to the said two track circuits.

4. In switch locking means, in combination with a stretch of track, a turn-out, a switch at the turn-out, means for operating the switch, a lock means for the switch operating means, means for initially rendering the lock means effective upon clearing a signal controlling traffic over the switch, means maintaining the lock means effective only if a train is approaching the signal at the time the signal is cleared, means automatically removing the locking after a predetermined time, provided the cleared signal is at once put back to stop, and means automatically removing the locking, and requiring the simultaneous occupancy of two adjacent track sections, provided the signal is put to stop.

5. Switch locking means for preventing operation of a railway track switch comprising, a normally energized stick relay which may be de-energized if a signal governing traffic over a track switch indicates clear only provided there is a train approaching such signal, a locking circuit permitting operation of said track switch including a contact closed when said signal is at stop and said stick relay is energized, means for automatically restoring said stick relay a predetermined time after said signal is put to stop when a train is approaching such signal provided there is no train passing over said track switch, and means for reenergizing said stick relay responsive to the passage of a train over said track switch.

ERNEST B. KEMPSTER, Jr.